(12) United States Patent
Togashi (10) Patent No.: US 10,809,563 B2
(45) Date of Patent: Oct. 20, 2020

(54) LIQUID CRYSTAL DISPLAY DEVICE (71) Applicant: SHARP KABUSHIKI KAISHA, Sakai, Osaka (JP)

(72) Inventor: Yasuyuki Togashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/444,885

(22) Filed: Jun. 18, 2019

(65) Prior Publication Data
US 2020/0004082 A1 Jan. 2, 2020

Related U.S. Application Data (60) Provisional application No. 62/690,660, filed on Jun. 27, 2018.

(51) Int. Cl.
*G02F 1/1335* (2006.01)
*G02F 1/1347* (2006.01)
*F21V 8/00* (2006.01)

(52) U.S. Cl.
CPC ..... *G02F 1/133528* (2013.01); *G02B 6/0056* (2013.01); *G02F 1/1347* (2013.01)

(58) Field of Classification Search
None
See application file for complete search history.

(56) References Cited

U.S. PATENT DOCUMENTS

| | | | | |
|---|---|---|---|---|
| 2012/0020056 A1* | 1/2012 | Yamagata | ......... | G02F 1/133308 362/97.1 |
| 2017/0123144 A1* | 5/2017 | Baek | ................ | G02F 1/133615 |
| 2018/0035554 A1* | 2/2018 | Liu | ......................... | G09F 9/301 |
| 2018/0231834 A1* | 8/2018 | Chen | ................ | G02F 1/133528 |
| 2018/0299611 A1* | 10/2018 | Wang | .................... | G02F 1/1337 |

FOREIGN PATENT DOCUMENTS

| | | |
|---|---|---|
| JP | 2005-250097 A | 9/2005 |
| JP | 2010-072505 A | 4/2010 |
| JP | 2011-085740 A | 4/2011 |
| JP | 2013-050535 A | 3/2013 |
| WO | 2010/125976 A1 | 11/2010 |

* cited by examiner

*Primary Examiner* — Ryan Crockett
(74) *Attorney, Agent, or Firm* — ScienBiziP, P.C.

(57) ABSTRACT

A liquid crystal display device of the present invention includes in the following order: a liquid crystal panel in a normally black mode; a first adhesive layer; and a supporting substrate. The liquid crystal panel includes, in the order toward the first adhesive layer, a first polarizing plate, a liquid crystal cell, and a second polarizing plate. The liquid crystal cell includes a first substrate, a second substrate facing the first substrate, a liquid crystal layer held between the first substrate and the second substrate, and a second adhesive layer that surrounds the liquid crystal layer and bonds the first substrate and the second substrate at outer edges. The first adhesive layer bonds the second polarizing plate and the supporting substrate at outer edges. A Young's modulus of the first adhesive layer is equal to or higher than a Young's modulus of the second adhesive layer.

5 Claims, 8 Drawing Sheets

-- Related Art --

FIG.6

-- Related Art --

FIG.8

-- Related Art --

FIG.9

-- Related Art --

US 10,809,563 B2

LIQUID CRYSTAL DISPLAY DEVICE

CROSS-REFERENCE TO RELATED APPLICATIONS

The present application claims priority under 35 U.S.C. § 119 to U.S. Provisional Patent Application No. 62/690,660 filed on Jun. 27, 2018, the contents of which are incorporated herein by reference in their entirety.

BACKGROUND OF THE INVENTION

Field of the Invention

The present invention relates to liquid crystal display devices.

Description of Related Art

In a recent situation where liquid crystal display devices are used in various applications, techniques for curving a liquid crystal panel, which is a component of a liquid crystal display device, have been studied (e.g., JP 2010-72505 A, JP 2005-250097 A, JP 2011-85740 A, JP 2013-50535 A, WO 2010/125976).

BRIEF SUMMARY OF THE INVENTION

Unfortunately, the present inventor found through studies that, when a liquid crystal panel in a normally black mode, such as an in-plane switching (IPS) mode liquid crystal panel, is curved, a phenomenon with pale white part called light leakage appears in a black display state.

Figure 5:
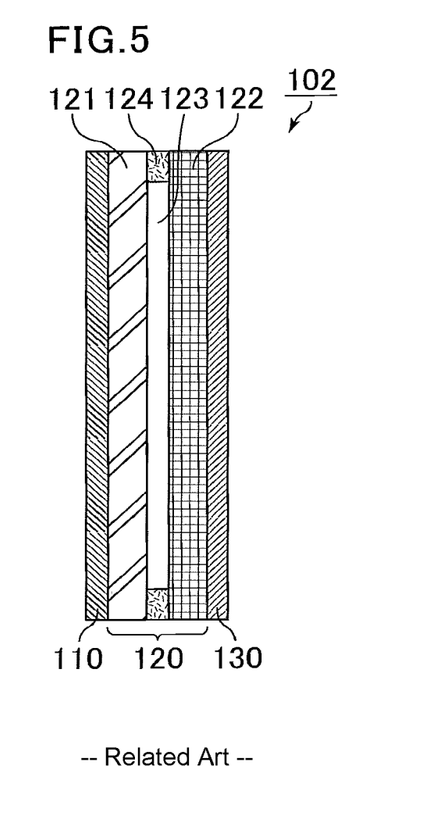
FIG. 5 is a schematic cross-sectional view of a conventional liquid crystal panel.

FIG. 5 is a schematic cross-sectional view of a conventional liquid crystal panel. As shown in FIG. 5, a liquid crystal panel 102 is a liquid crystal panel in a normally black mode (e.g., IPS mode) and includes, in the order from the viewing surface side to the back surface side, a first polarizing plate 110, a liquid crystal cell 120, and a second polarizing plate 130.

The liquid crystal cell 120 includes a first substrate 121, a second substrate 122, a liquid crystal layer 123, and a sealant 124. In the liquid crystal cell 120, the first substrate 121 is disposed on the first polarizing plate 110 side, and the second substrate 122 is disposed on the second polarizing plate 130 side and faces the first substrate 121. The liquid crystal layer 123 is held between the first substrate 121 and the second substrate 122. The sealant 124 surrounds the liquid crystal layer 123 and bonds the first substrate 121 and the second substrate 122 at the outer edges.

In the liquid crystal panel 102 in the no-curved state, when light is emitted from a backlight on the second polarizing plate 130 side (back surface side), the panel provides black display with no voltage applied to the liquid crystal layer 123. Specifically, light emitted from the backlight passes through the second polarizing plate 130 to be converted into linearly polarized light that vibrates in the direction parallel to the transmission axis of the second polarizing plate 130. The linearly polarized light having passed through the second polarizing plate 130 sequentially passes through the second substrate 122, the liquid crystal layer 123, and the first substrate 121 to be blocked (absorbed) by the first polarizing plate 110 whose transmission axis is set to be perpendicular to the transmission axis of the second polarizing plate 130.

Figure 6:
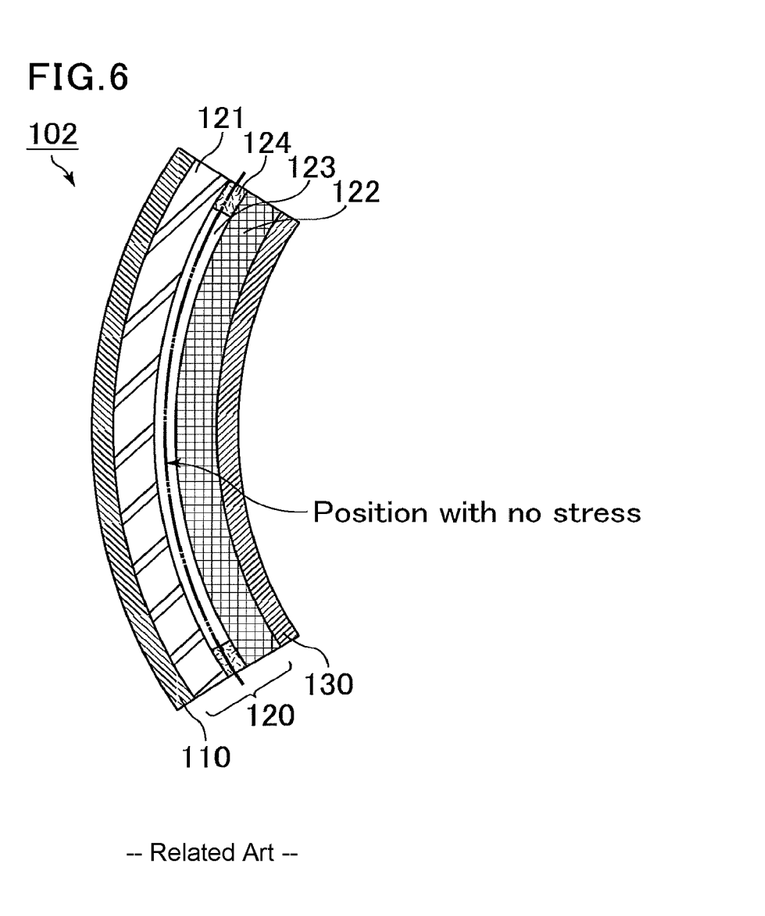
FIG. 6 is a schematic cross-sectional view showing a curved state of the liquid crystal panel in FIG. 5.

FIG. 6 is a schematic cross-sectional view showing a curved state of the liquid crystal panel in FIG. 5. As shown in FIG. 6, in the liquid crystal panel 102 in the curved state, when the first substrate 121 and the second substrate 122 have the same thickness, the first substrate 121 has a tensile stress and the second substrate 122 has a compressive stress, with the liquid crystal layer 123 serving as a boundary (a position without stress). This causes the first substrate 121 and the second substrate 122 to have a photoelastic retardation.

Figure 7:
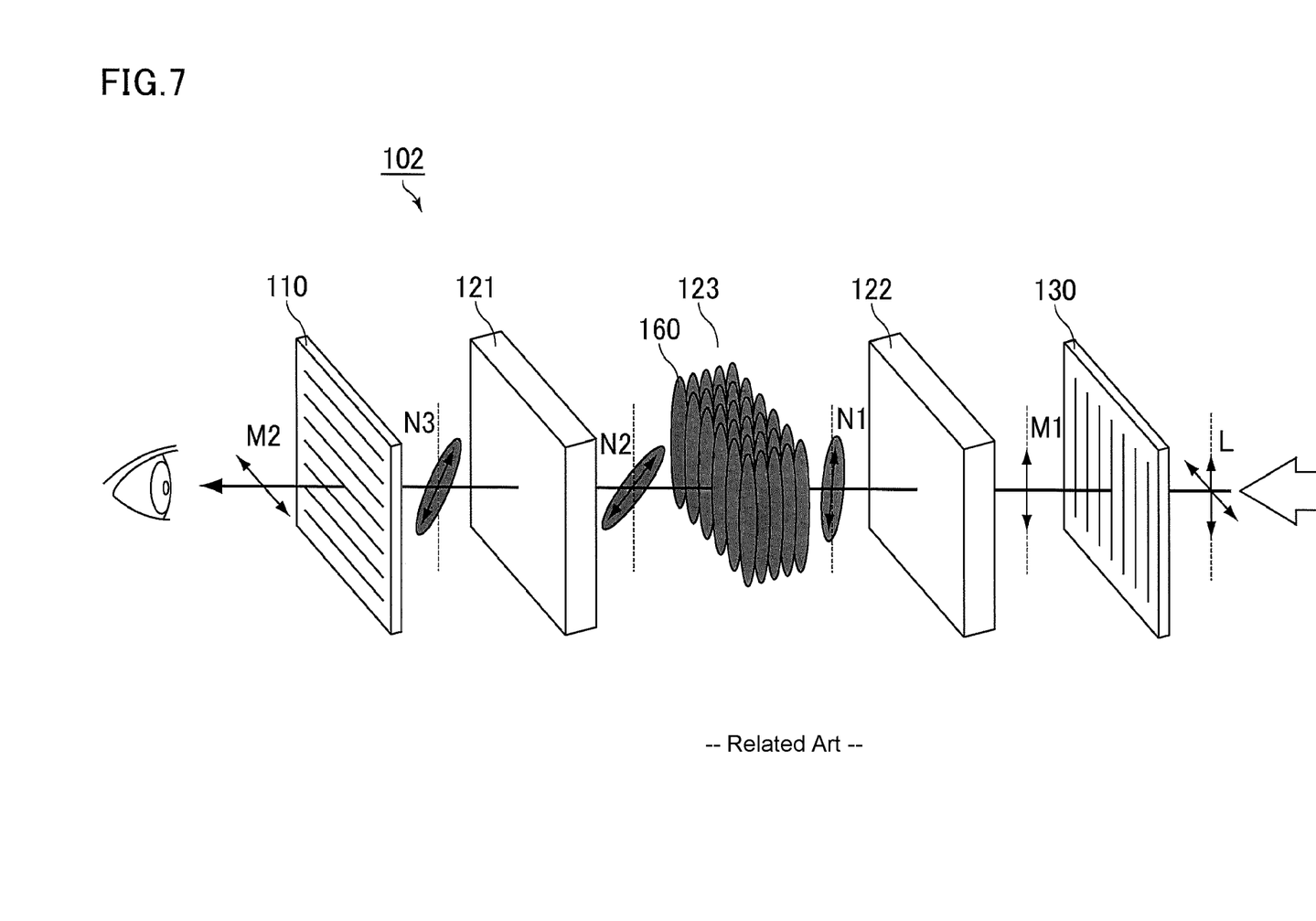
FIG. 7 is a schematic perspective view for illustrating the display principle of the liquid crystal panel in FIG. 6.

FIG. 7 is a schematic perspective view for illustrating the display principle of the liquid crystal panel in FIG. 6. Differently from FIG. 6, FIG. 7 separately shows the first polarizing plate 110, the first substrate 121, the liquid crystal layer 123, the second substrate 122, and the second polarizing plate 130, each being in the no-curved state, for convenience.

As shown in FIG. 7, light L emitted from the backlight passes through the second polarizing plate 130 to be converted into linearly polarized light M1 that vibrates in the direction parallel to the transmission axis of the second polarizing plate 130. The linearly polarized light M1 having passed through the second polarizing plate 130 then passes through the second substrate 122 to have a retardation due to a compressive stress when the panel is curved, and thereby to be converted into elliptically polarized light N1. The elliptically polarized light N1 having passed through the second substrate 122 does not vibrate in the direction parallel to the major axes of liquid crystal molecules 160 in the liquid crystal layer 123 with no voltage applied. Thus, the elliptically polarized light N1 has an increased retardation when passing through the liquid crystal layer 123, and is thereby converted into elliptically polarized light N2. The elliptically polarized light N2 having passed through the liquid crystal layer 123 passes through the first substrate 121 to have a retardation due to a tensile stress when the panel is curved, and thereby to be converted into elliptically polarized light N3. Then, part of the elliptically polarized light N3 having passed through the first substrate 121, which vibrates in the direction parallel to the transmission axis of the first polarizing plate 110, passes through the first polarizing plate 110 as linearly polarized light M2, which is resultantly perceived as light leakage.

Figure 8:
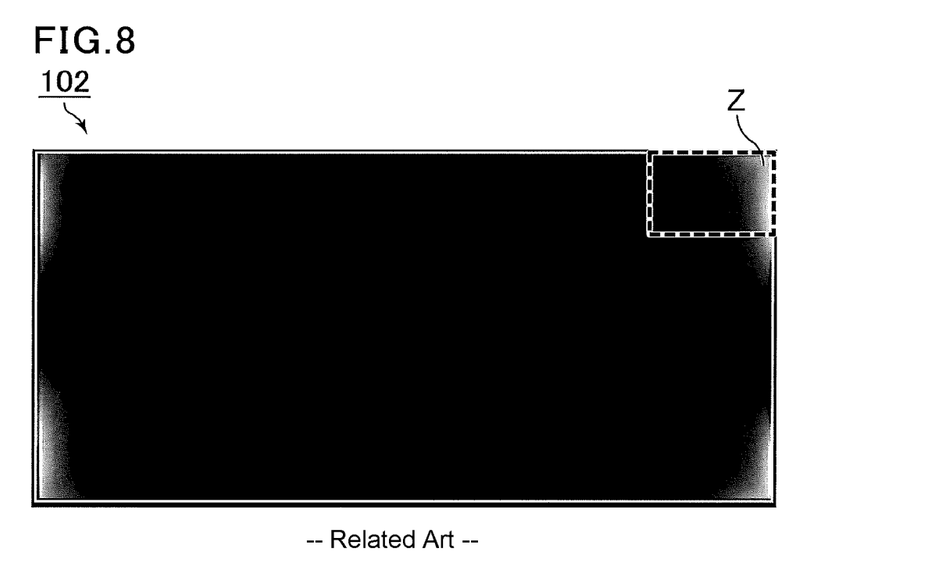
FIG. 8 is a photograph of a black display screen of the liquid crystal panel in FIG. 6, taken from the first polarizing plate side.

The present inventor found that such light leakage is perceived around the corners of a black display screen. FIG. 8 is a photograph of a black display screen of the liquid crystal panel in FIG. 6, taken from the first polarizing plate side. In the liquid crystal panel 102 in the curved state, as shown in FIG. 8, light leakage Z is perceived around each corner of the black display screen. The present inventor considers the cause of this as follows.

In the liquid crystal panel 102, the first substrate 121 and the second substrate 122 are bonded at the outer edges (four sides) by the sealant 124. Thereby, in the liquid crystal panel 102 in the curved state, the second substrate 122 has a compressive stress while the region around each corner of the second substrate 122 is pulled by the sealant 124. As a result, the direction of the compressive stress in the region around each corner of the second substrate 122 is shifted from the direction in the other regions, whereby the region around each corner has a great retardation. Similarly in the first substrate 121, in the liquid crystal panel 102 in the curved state, the direction of the tensile stress in the region around each corner is shifted from the direction in the other regions, whereby the region around each corner has a great retardation.

Figure 9:
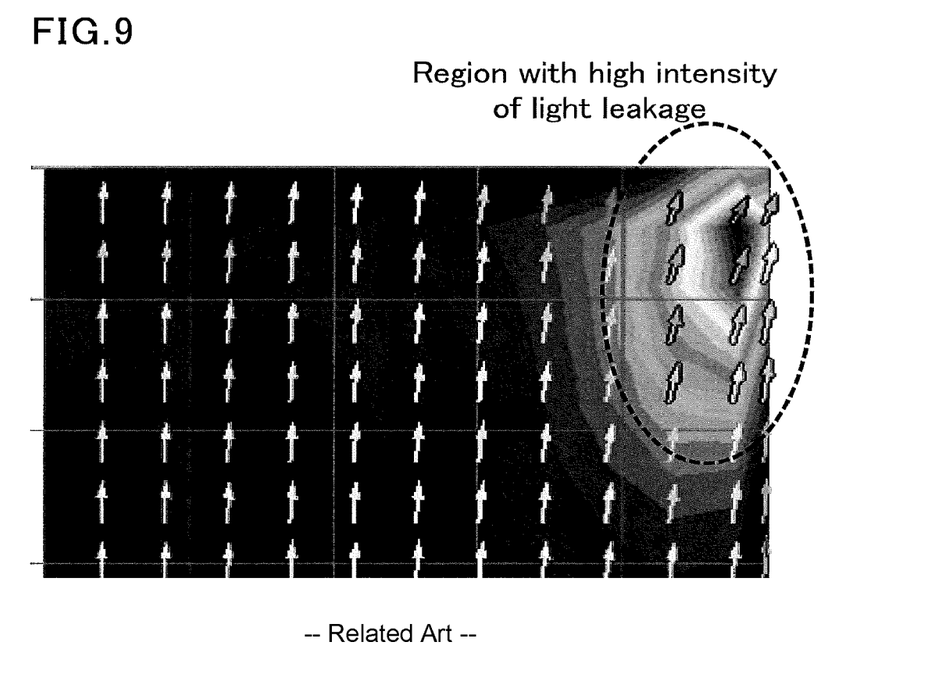
FIG. 9 shows a simulation result showing a relation between the intensity of light leakage and the direction of a compressive stress in the second substrate in the region around a corner, which is surrounded by a dotted line in FIG. 8.

FIG. 9 shows a simulation result showing a relation between the intensity of light leakage and the direction of a compressive stress in the second substrate in the region around a corner, which is surrounded by a dotted line in FIG. 8. In FIG. 9, the intensity of light leakage is represented by contours, the direction of the compressive stress is represented by arrows, and the short direction corresponds to the direction of the transmission axis of the second polarizing plate 130. FIG. 9 indicates that the direction of the compressive stress in the region around each corner of the second substrate 122 is shifted from the direction in the other regions. FIG. 9 also indicates that the intensity of light leakage increases in the region around each corner of a black display screen while regions other than the region around each corner of the black display screen causes no light leakage.

The intensity of light leakage is known to have a proportional relation represented by the following formula (F).

$$\text{"Intensity of light leakage"} \propto [(C^2 t^4 E^2) \times \sin^2(2(\beta-\alpha))]/R^2 \quad (F)$$

α: azimuth angle of the transmission axis of the second polarizing plate 130 (first polarizing plate 110)

β: azimuth angle of the compressive stress (tensile stress) in the second substrate 122 (first substrate 121)

C: photoelastic constant of the second substrate 122 (first substrate 121)

t: thickness of the second substrate 122 (first substrate 121)

E: Young's modulus of the second substrate 122 (first substrate 121)

R: curvature radius of the second substrate 122 (first substrate 121)

According to the formula (F), the intensity of light leakage increases as β−α becomes close to 45°. Meanwhile, the intensity of light leakage is 0 when β−α is 0° or 90°. This is proofed by the simulation result shown in FIG. 9.

As described, conventional liquid crystal display devices have an object for suppressing light leakage in the black display state when a liquid crystal panel in a normally black mode is curved. The arts disclosed in JP 2010-72505 A, JP 2005-250097 A, JP 2011-85740 A, JP 2013-50535 A, and WO 2010/125976, for example, still have room for improvement in suppressing such light leakage in the black display state.

The present invention has been made under the current situation in the art and aims to provide a liquid crystal display device that suppresses light leakage in the black display state when being curved.

(1) One embodiment of the present invention is directed to a liquid crystal display device including in the following order: a liquid crystal panel in a normally black mode; a first adhesive layer; and a supporting substrate, the liquid crystal panel including, in the order toward the first adhesive layer, a first polarizing plate, a liquid crystal cell, and a second polarizing plate, the liquid crystal cell including a first substrate, a second substrate facing the first substrate, a liquid crystal layer held between the first substrate and the second substrate, and a second adhesive layer that surrounds the liquid crystal layer and bonds the first substrate and the second substrate at outer edges, the first adhesive layer bonding the second polarizing plate and the supporting substrate at outer edges, a Young's modulus of the first adhesive layer being equal to or higher than a Young's modulus of the second adhesive layer.

(2) In an embodiment of the present invention, the liquid crystal display device includes the structure (1), and the first adhesive layer and the second adhesive layer are formed from a same material.

(3) In an embodiment of the present invention, the liquid crystal display device includes the structure (1) or (2), and the first adhesive layer and the second adhesive layer have a same width.

(4) In an embodiment of the present invention, the liquid crystal display device includes any one of the structures (1) to (3), and the first adhesive layer and the second adhesive layer have a same thickness.

(5) In an embodiment of the present invention, the liquid crystal display device includes any one of the structures (1) to (4), and the supporting substrate, the first substrate, and the second substrate are formed from a same material.

(6) In an embodiment of the present invention, the liquid crystal display device includes any one of the structures (1) to (5), and the first substrate and the second substrate have a same thickness.

(7) In an embodiment of the present invention, the liquid crystal display device includes the structure (6), and the supporting substrate, the first substrate, and the second substrate have a same thickness.

The present invention can provide a liquid crystal display device that suppresses light leakage in a black display state when being curved.

DETAILED DESCRIPTION OF THE INVENTION

The present invention is described below in more detail based on an embodiment with reference to the drawings. The embodiment, however, is not intended to limit the scope of the present invention. The configurations employed in the embodiment may appropriately be combined or modified within the spirit of the present invention.

Herein, "X to Y" means "X or more and Y or less".

Embodiment

Figure 1:
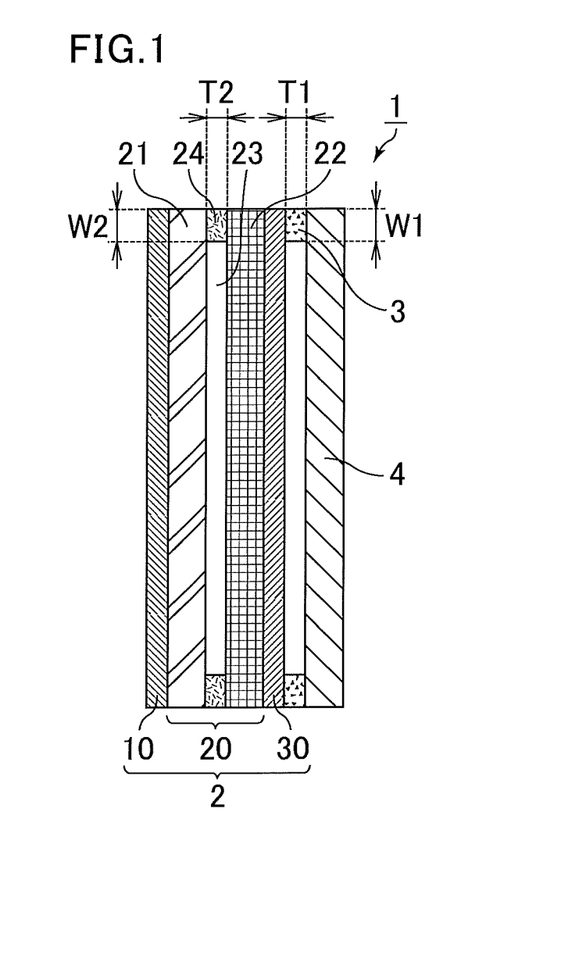
FIG. 1 is a schematic cross-sectional view of a liquid crystal display device of an embodiment.
Figure 2:
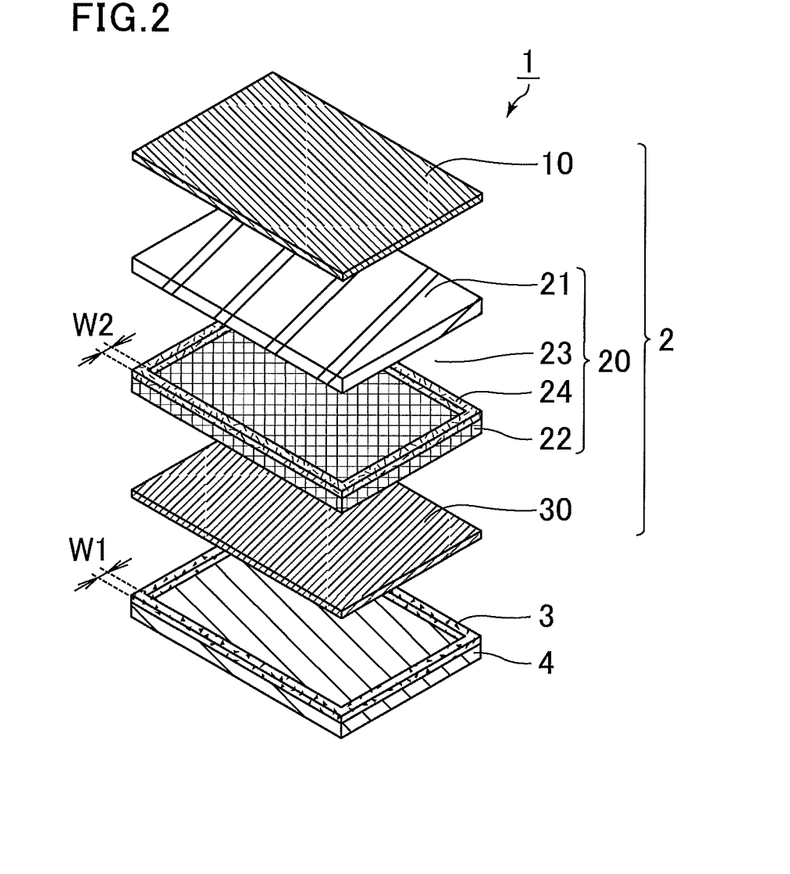
FIG. 2 is a schematic perspective view of the liquid crystal display device of the embodiment.

FIG. 1 is a schematic cross-sectional view of a liquid crystal display device of an embodiment. FIG. 2 is a schematic perspective view of the liquid crystal display device of the embodiment. FIG. 2 separately shows the components for convenience.

As shown in FIGS. 1 and 2, a liquid crystal display device 1 includes, in the order from the viewing surface side to the back surface side, a liquid crystal panel 2, a first adhesive layer 3, and a supporting substrate 4.

The viewing surface side herein means a side close to the screen (display surface) of the liquid crystal display device and is, for example, the liquid crystal panel 2 side of the liquid crystal display device 1 in FIG. 1. The back surface side herein means a side remote from the screen (display surface) of the liquid crystal display device and is, for example, the supporting substrate 4 side of the liquid crystal display device 1 in FIG. 1.

The liquid crystal panel 2 includes, in the order toward the first adhesive layer 3, a first polarizing plate 10, a liquid crystal cell 20, and a second polarizing plate 30.

The liquid crystal panel 2 is a liquid crystal panel in a normally black mode such as an IPS mode liquid crystal panel. The liquid crystal panel in a normally black mode herein means a liquid crystal panel whose light transmittance is minimum (black display state) with no voltage applied to the liquid crystal layer and whose light transmittance increases as voltage applied to the liquid crystal layer increases.

The liquid crystal cell 20 includes a first substrate 21, a second substrate 22, a liquid crystal layer 23, and a second adhesive layer 24. In the liquid crystal cell 20, the first substrate 21 is disposed on the first polarizing plate 10 side, and the second substrate 22 is disposed on the second polarizing plate 30 side and faces the first substrate 21. The liquid crystal layer 23 is held between the first substrate 21 and the second substrate 22. The second adhesive layer 24 surrounds the liquid crystal layer 23 and bonds the first substrate 21 and the second substrate 22 at the outer edges.

The first substrate 21 may be a transparent substrate such as a glass substrate or a plastic substrate. On the liquid crystal layer 23 side of the first substrate 21, components such as color filters, black matrix, and an overcoat may be appropriately disposed. These components may be conventionally known products.

The second substrate 22 may be a transparent substrate such as a glass substrate or a plastic substrate. On the liquid crystal layer 23 side of the second substrate 22, components such as gate lines, source lines, thin film transistor elements, and electrodes may be appropriately disposed. These components may be conventionally known products.

The liquid crystal material contained in the liquid crystal layer 23 may be a positive liquid crystal material having positive anisotropy of dielectric constant or a negative liquid crystal material having negative anisotropy of dielectric constant. For example, in the case where the liquid crystal panel 2 is an IPS mode liquid crystal panel, liquid crystal molecules in the liquid crystal layer 23 are horizontally aligned in a certain direction with no voltage applied to the liquid crystal layer 23. The liquid crystal molecules in the liquid crystal layer 23 rotate in an in-plane direction according to the transverse electric field generated in the liquid crystal layer 23 with voltage applied to the liquid crystal layer 23.

The second adhesive layer 24 may be, for example, a cured product of a curable resin-containing adhesive such as an acrylic epoxy adhesive. The curable resin-containing adhesive may be one cured by light (photocurable adhesive), heat (heat curable adhesive), or both of light and heat (photo- and heat-curable adhesive). The second adhesive layer 24 is also referred to as sealant in the field of liquid crystal display devices.

The first polarizing plate 10 and the second polarizing plate 30 may each be, for example, a product formed by dyeing a polyvinyl alcohol film with an anisotropic material such as an iodine complex (or dye) to adsorb the anisotropic material on the film and then stretch-aligning the film. The polarizing plate herein means a linear polarizing plate (absorptive polarizing plate) and is different from a circularly polarizing plate.

The transmission axis of the first polarizing plate 10 and the transmission axis of the second polarizing plate 30 are preferably perpendicular to each other. This allows the first polarizing plate 10 and the second polarizing plate 30 to be arranged in crossed Nicols. Thus, in the case where the liquid crystal panel 2 is an IPS mode liquid crystal panel, for example, the display device efficiently provides black display with no voltage applied to the liquid crystal layer 23 and gray scale display (e.g., intermediate gray-scale display, white display) with voltage applied to the liquid crystal layer 23. The phrase "two axes are perpendicular to each other" herein means that the angle formed by the two axes is 87° to 93°, preferably 89° to 91°, more preferably 89.5° to 90.5°, particularly preferably 90° (perfectly perpendicular to each other).

The first adhesive layer 3 bonds the second polarizing plate 30 and the supporting substrate 4 at the outer edges. The first adhesive layer 3 may be, for example, a cured product of a curable resin-containing adhesive such as an acrylic epoxy adhesive. The curable resin-containing adhesive may be one cured by light (photocurable adhesive), heat (heat curable adhesive), or both of light and heat (photo- and heat-curable adhesive).

The supporting substrate 4 may be a transparent substrate such as a glass substrate or a plastic substrate.

In the liquid crystal device 1 which is in the no-curved state and in which the liquid crystal panel 2 is an IPS mode liquid crystal panel, for example, when light is emitted from a backlight on the supporting substrate 4 side (back surface side), the panel provides black display with no voltage applied to the liquid crystal layer 23. Specifically, light emitted from the backlight sequentially passes through the supporting substrate 4 and the second polarizing plate 30 to be converted into linearly polarized light that vibrates in the direction parallel to the transmission axis of the second polarizing plate 30. The linearly polarized light having passed through the second polarizing plate 30 sequentially passes through the second substrate 22, the liquid crystal layer 23, and the first substrate 21 to be blocked (absorbed) by the first polarizing plate 10 whose transmission axis is set to be perpendicular to the transmission axis of the second polarizing plate 30.

Figure 3:
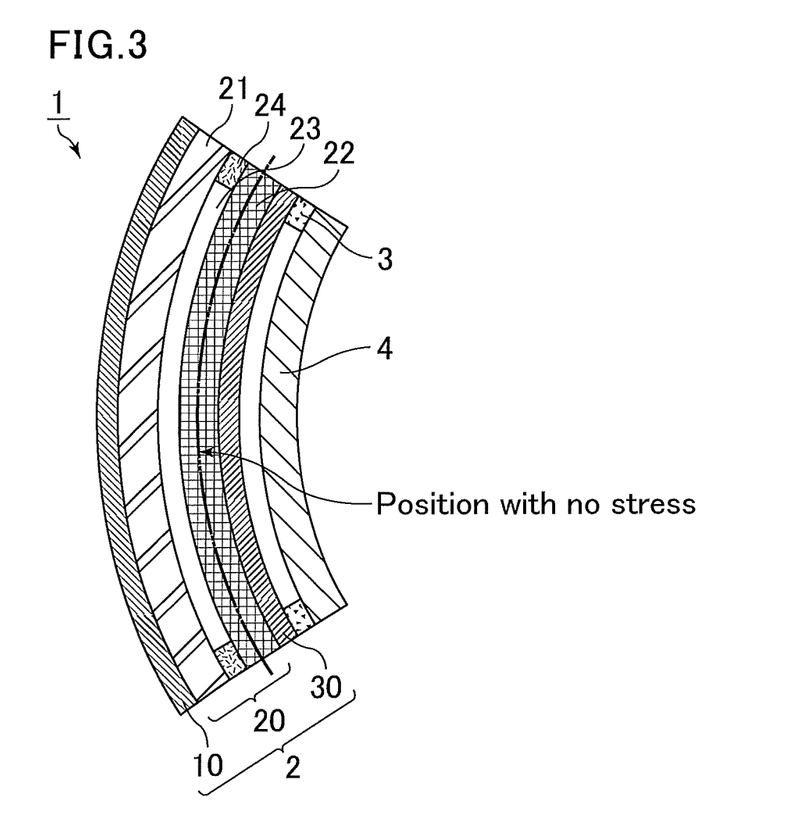
FIG. 3 is a schematic cross-sectional view showing a curved state of the liquid crystal display device in FIG. 1.

FIG. 3 is a schematic cross-sectional view showing a curved state of the liquid crystal display device in FIG. 1. In the liquid crystal display device 1 in the curved state, as shown in FIG. 3, the first substrate 21 has a tensile stress and the supporting substrate 4 has a compressive stress. In the liquid crystal display device 1, the supporting substrate 4 is attached to the second polarizing plate 30. Thereby, the position with no stress (position at which the tensile stress and the compressive stress are balanced) when the device is curved moves to the second substrate 22 side, as compared with the conventional case (FIG. 6). The stress in the second substrate 22 is thus suppressed. This structure suppresses the retardation in the second substrate 22, thereby suppressing the light leakage in the black display state of the liquid crystal display device 1 when the device is curved, as compared with the conventional case (FIG. 6).

In this case, incident light from the supporting substrate 4 side (back surface side) (light emitted from the backlight) is imparted with a retardation due to the compressive stress in the supporting substrate 4. However, the light then passes through the second polarizing plate 30 to be converted into linearly polarized light. Thus, the influence of the retardation in the supporting substrate 4 on the light leakage can be ignored. Meanwhile, the thickness of the liquid crystal display device 1 is increased by the thickness of the supporting substrate 4. Thus, the first substrate 21 may have a greater tensile stress than in the conventional case (FIG. 6). However, the retardation due to the tensile stress in the first substrate 21 is much smaller than the retardation in the liquid crystal layer 23. The retardation in the first substrate 21 thus has a slight influence on the light leakage.

In order to suppress light leakage in the black display state when being curved, the liquid crystal display device 1 has a structure in which the Young's modulus of the first adhesive layer 3 is equal to or higher than, preferably the same as, the Young's modulus of the second adhesive layer 24, in addition to a structure in which the liquid crystal display device 1 includes the supporting substrate 4. These structures achieve that even when the liquid crystal display device 1 is curved, the supporting substrate 4 is less likely to be shifted from the liquid crystal panel 2 (second polarizing plate 30), thereby achieving less change of the curvature thereof (less deformation). As described, the light leakage in the black display state when the liquid crystal display device 1 is curved can be significantly suppressed by setting the Young's modulus of the first adhesive layer 3 higher than the Young's modulus of the second adhesive layer 24, in addition to disposing the supporting substrate 4.

In the case where the first adhesive layer 3 has a Young's modulus lower than the Young's modulus of the second adhesive layer 24, for example, in the case where the first adhesive layer 3 is replaced by an optical clear adhesive (OCA), which is a pressure-sensitive adhesive layer, and the second adhesive layer 24 is formed of an acrylic epoxy adhesive, the ends of the liquid crystal display device 1 are pulled in the direction the OCA is peeled. Thereby, the liquid crystal display device 1 tends to have variation in curvature (tends to be deformed) when the liquid crystal display device 1 is curved. As a result, light leakage in the black display state cannot be suppressed.

The Young's modulus of the first adhesive layer 3 is preferably 50 MPa or higher, more preferably 75 to 77 MPa. The Young's modulus of the second adhesive layer 24 is preferably 50 MPa or higher, more preferably 75 to 77 MPa. When the Young's moduli of the first adhesive layer 3 and the second adhesive layer 24 fall within the above range, the liquid crystal display device 1 can be curved with suppressed deformation.

Herein, the Young's modulus of an adhesive layer means the Young's modulus at 23° C. of a cured adhesive layer having specifications (e.g., material, width, thickness) actually used in the liquid crystal display device.

In order to suppress light leakage in the black display state when the liquid crystal display device 1 is curved, the following structure is also preferred.

The first adhesive layer 3 and the second adhesive layer 24 are preferably formed from the same material. The phrase "formed from the same material" herein means that the main components (the components included at the highest content) in the material are the same as each other, and thus not all the components need to be the same as each other. Still, all the components are preferably the same as each other.

The first adhesive layer 3 and the second adhesive layer 24 preferably have the same width. In FIGS. 1 and 2, the width W1 of the first adhesive layer 3 and the width W2 of the second adhesive layer 24 are each 1 mm, for example.

The first adhesive layer 3 and the second adhesive layer 24 preferably have the same thickness. In FIG. 1, the thickness T1 of the first adhesive layer 3 and the thickness T2 of the second adhesive layer 24 are each 4 µm, for example.

As mentioned above, the structure in which the Young's modulus of the first adhesive layer 3 is equal to or higher than the Young's modulus of the second adhesive layer 24 can be efficiently achieved by adjusting the specifications (e.g., material, width, thickness) of the first adhesive layer 3 and the second adhesive layer 24. The first adhesive layer 3 and the second adhesive layer 24 may have different specifications (e.g., material, width, thickness) as long as satisfying the structure in which the Young's modulus of the first adhesive layer 3 is equal to or higher than the Young's modulus of the second adhesive layer 24.

The supporting substrate 4, the first substrate 21, and the second substrate 22 are preferably formed from the same material.

The first substrate 21 and the second substrate 22 preferably have the same thickness. Particularly preferably, the supporting substrate 4, the first substrate 21, and the second substrate 22 have the same thickness.

Here, as mentioned above, the intensity of light leakage is known to satisfy a proportional relation represented by the following formula (F). That is, the intensity of light leakage is proportional to the fourth power of the thickness of the second substrate 22 (first substrate 21). Accordingly, the thickness of the second substrate 22 (first substrate 21) is preferably small. Specifically, in consideration of production efficiency, the second substrate 22 (first substrate 21) has a thickness of preferably 0.1 to 0.2 mm. In this case, the supporting substrate 4 also has a thickness of preferably 0.1 to 0.2 mm.

"Intensity of light leakage"$\propto [(C^2 t^4 E^2) \times \sin^2(2(\beta-\alpha))]/R^2$ (F)

$\alpha$: azimuth angle of the transmission axis of the second polarizing plate 30 (first polarizing plate 10)

$\beta$: azimuth angle of compressive stress (tensile stress) in the second substrate 22 (first substrate 21)

C: photoelastic constant of the second substrate 22 (first substrate 21)

t: thickness of the second substrate 22 (first substrate 21)

E: Young's modulus of the second substrate 22 (first substrate 21)

R: curvature radius of the second substrate 22 (first substrate 21)

As mentioned above, adjustment of the specifications (e.g., material, thickness) of the supporting substrate 4, the first substrate 21, and the second substrate 22 tends to set the position with no stress when the device is curved around the center of the second substrate 22 in the thickness direction. This efficiently suppresses the stress in the second substrate 22. The supporting substrate 4, the first substrate 21, and the second substrate 22 may have different specifications (e.g., material, thickness) as long as satisfying the structure in which the position with no stress when the device is curved comes on the second substrate 22 side.

As shown in FIGS. 1 and 2, in the liquid crystal display device 1, the first adhesive layer 3 preferably bonds the second polarizing plate 30 and the supporting substrate 4 only at the outer edges, and the second adhesive layer 24 preferably bonds the first substrate 21 and the second substrate 22 only at the outer edges. In the liquid crystal display device 1 in the no-curved state, the first adhesive layer 3 and the second adhesive layer 24 are preferably superimposed with each other. These structures allow the liquid crystal display device 1 to be curved with suppressed deformation.

Figure 4:
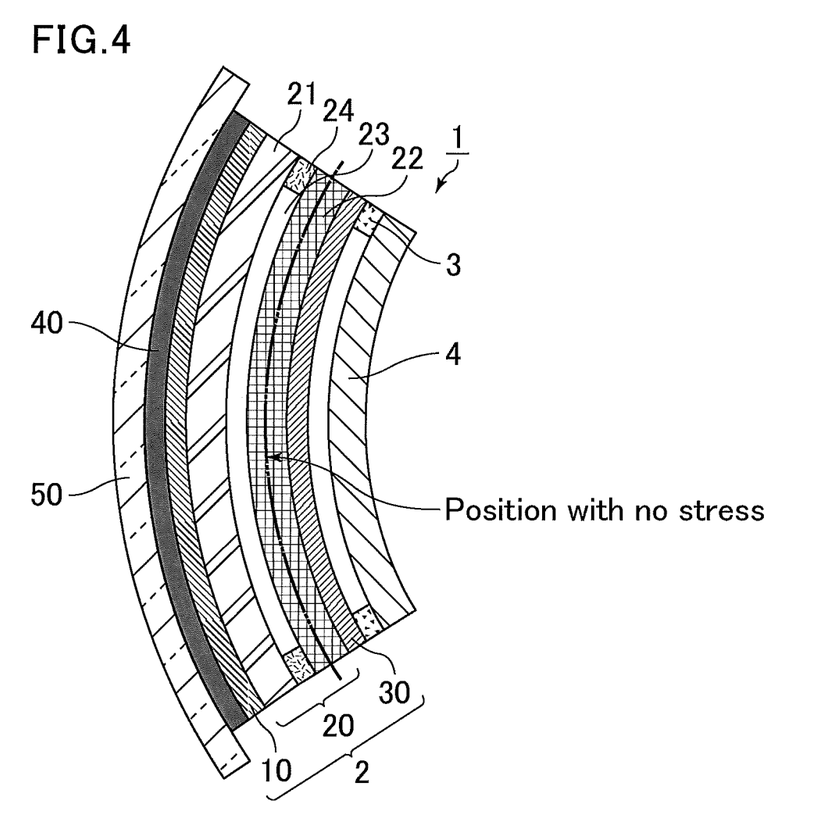
FIG. 4 is a schematic cross-sectional view showing the case where the liquid crystal display device of the embodiment is applied to a smartphone.

The liquid crystal display device 1 may be used for any application usable in a curved state, such as mobile applications including smartphones. FIG. 4 is a schematic cross-sectional view showing the case where the liquid crystal display device of the embodiment is applied to a smartphone. As shown in FIG. 4, the liquid crystal display device 1 in a curved state may be attached to a protective substrate 50 such as a glass substrate or an acryl substrate, which is curved by heating, with an OCA 40. In this case, the position with no stress when being curved comes to the same position as in the case in FIG. 3. Thus, the intensity of light leakage in the black display state does not increase. Another application example may be that the liquid crystal display device 1 is curved with the display device fixed only at the outer edges with a member such as a frame.

Although the present embodiment describes the case where the liquid crystal display device 1 is curved to have a convex surface on the viewing surface side, the liquid crystal display device 1 may be curved to have a concave surface on the viewing surface side.

What is claimed is:

1. A liquid crystal display device comprising in the following order:
    a liquid crystal panel in a normally black mode;
    a first adhesive layer; and
    a supporting substrate,
    the liquid crystal panel including, in the order toward the first adhesive layer, a first polarizing plate, a liquid crystal cell, and a second polarizing plate,
    the liquid crystal cell including a first substrate, a second substrate facing the first substrate, a liquid crystal layer held between the first substrate and the second substrate, and a second adhesive layer that surrounds the liquid crystal layer and bonds the first substrate and the second substrate at outer edges,
    the first adhesive layer bonding the second polarizing plate and the supporting substrate at outer edges,
    a Young's modulus of the first adhesive layer being equal to or higher than a Young's modulus of the second adhesive layer, and
    the first adhesive layer and the second adhesive layer having a same width or a same thickness.

2. The liquid crystal display device according to claim 1, wherein the first adhesive layer and the second adhesive layer are formed from a same material.

3. The liquid crystal display device according to claim 1, wherein the supporting substrate, the first substrate, and the second substrate are formed from a same material.

4. The liquid crystal display device according to claim 1, wherein the first substrate and the second substrate have a same thickness.

5. A liquid crystal display device comprising in the following order:
    a liquid crystal panel in a normally black mode;
    a first adhesive layer; and
    a supporting substrate,
    the liquid crystal panel including, in the order toward the first adhesive layer, a first polarizing plate, a liquid crystal cell, and a second polarizing plate,
    the liquid crystal cell including a first substrate, a second substrate facing the first substrate, a liquid crystal layer held between the first substrate and the second substrate, and a second adhesive layer that surrounds the liquid crystal layer and bonds the first substrate and the second substrate at outer edges,
    the first adhesive layer bonding the second polarizing plate and the supporting substrate at outer edges,
    a Young's modulus of the first adhesive layer being equal to or higher than a Young's modulus of the second adhesive layer,
    wherein the supporting substrate, the first substrate, and the second substrate have a same thickness.

* * * * *